(12) United States Patent
Leotsakos et al.

(10) Patent No.: US 8,853,284 B2
(45) Date of Patent: Oct. 7, 2014

(54) WAX DISPERSION FORMULATIONS, METHOD OF PRODUCING SAME, AND USES

(75) Inventors: George Leotsakos, Sparta, NJ (US); Wayne M. Gravatt, Freehold, NJ (US); Christopher P. Smith, Hampton, NJ (US); Michael A. Kocur, Union, NJ (US)

(73) Assignee: Honeywell International Inc., Morristown, NJ (US)

( * ) Notice: Subject to any disclaimer, the term of this patent is extended or adjusted under 35 U.S.C. 154(b) by 292 days.

(21) Appl. No.: 12/471,966

(22) Filed: May 26, 2009

(65) Prior Publication Data

US 2009/0298971 A1 Dec. 3, 2009

Related U.S. Application Data

(60) Provisional application No. 61/058,027, filed on Jun. 2, 2008.

(51) Int. Cl.
*C08K 9/10* (2006.01)
*C08L 23/06* (2006.01)
*C09D 133/06* (2006.01)
*C08K 5/42* (2006.01)
*C08K 5/06* (2006.01)

(52) U.S. Cl.
CPC ............. *C09D 133/06* (2013.01); *C08L 23/06* (2013.01); *C08K 5/42* (2013.01); *C08K 5/06* (2013.01); *C08K 9/10* (2013.01)
USPC .............................. 516/77; 523/207; 524/586

(58) Field of Classification Search
CPC ..... C08L 91/06; C08L 2666/02; C08L 53/00; C08I 71/02; C08K 9/04; C08K 5/00; C08K 5/42; C09D 153/00; C09D 191/06; C09D 5/027
USPC .............................. 516/77; 523/207; 524/586
See application file for complete search history.

(56) References Cited

U.S. PATENT DOCUMENTS

| | | | |
|---|---|---|---|
| 4,183,757 A * | 1/1980 | Groszek et al. | 106/14.11 |
| 4,468,254 A * | 8/1984 | Yokoyama et al. | 106/271 |
| 5,294,251 A * | 3/1994 | Urena | 106/271 |
| 5,368,972 A | 11/1994 | Yamashita et al. | |
| 5,743,949 A | 4/1998 | Kainz | 106/271 |
| 5,746,812 A | 5/1998 | Muller et al. | |
| 5,849,278 A | 12/1998 | Piot et al. | |
| 5,885,743 A | 3/1999 | Takayanagi et al. | |
| 5,959,020 A | 9/1999 | Oliveri et al. | 524/487 |
| 6,048,678 A * | 4/2000 | Schwark et al. | 430/527 |
| 6,784,251 B2 | 8/2004 | Lences et al. | 525/221 |
| 7,307,042 B2 | 12/2007 | Sakurai et al. | 503/226 |
| 2005/0100754 A1 | 5/2005 | Moncla et al. | 428/523 |
| 2005/0271888 A1 | 12/2005 | Moncla et al. | 428/523 |
| 2006/0166821 A1 | 7/2006 | Sakurai et al. | 503/200 |
| 2007/0292705 A1 | 12/2007 | Moncla et al. | 428/523 |
| 2008/0029924 A1 | 2/2008 | Maezawa | 264/117 |

FOREIGN PATENT DOCUMENTS

| | | |
|---|---|---|
| EP | 1349012 A2 | 10/2003 |
| EP | 1547799 | 6/2005 |
| EP | 1806237 | 7/2007 |
| GB | WO2009125199 | 10/2009 |
| JP | 663387 A | 3/1994 |
| JP | 2006009341 A | 1/1997 |
| JP | 9502216 A | 3/1997 |
| JP | 2001253946 A | 9/2001 |
| JP | 2002006545 A | 1/2002 |
| JP | 2002069386 A | 3/2002 |
| JP | 2002069302 A | 8/2002 |
| JP | 2002309152 A | 10/2002 |
| JP | 2003295515 A | 10/2003 |
| JP | 2004300378 A | 10/2004 |
| JP | 2007033717 A | 2/2007 |
| JP | 2007072488 A | 3/2007 |
| WO | WO2007079431 | 7/2007 |

OTHER PUBLICATIONS

"M-110S Microfluidizer Materials Processor" (Microfluidics Corp., printed Feb. 2008).*
Iach-chemical ("Chemical Formulations", Microfluidics Corp., printed Mar. 2006).*
Product Information HydroWax 46, published May 2006.
Product Information Mobilcer 46, published Jan. 1998.
Rompp, p. 4530—catch word "Viskosimetrie".
Method MM 1428 Mobil, published Jan. 1997.
Declaration of Dr. Ing. G. Meyer.
8 Invoices relating to HydroWax 46 (2005-2007).
Notice of Opposition mailed Jan. 8, 2013 in European Application No. 09759105.1.

* cited by examiner

*Primary Examiner* — Bijan Ahvazi
*Assistant Examiner* — Chun-Cheng Wang
(74) *Attorney, Agent, or Firm* — Carrie Beatus

(57) ABSTRACT

Aqueous wax dispersions useful as surface modifiers for paints, inks and coatings. More particularly, aqueous particulate wax dispersions useful as surface modifiers to provide improved properties in primers, paints, inks and other coating formulations. The dispersions are stable, substantially homogenous, have a high solids concentration at low viscosities, and comply with the applicable FDA regulations for use in food packaging applications.

11 Claims, 5 Drawing Sheets

| Distribution: | Volume | Run Time: | 30 Sec. | Fluid: | WATER | | | |
|---|---|---|---|---|---|---|---|---|
| Progression: | Geom 8 Root | Run Num.: | Avg. of 3 | Fluid Ref. Index: | 1.333 | Loading Factor: | 0.008 | |
| Up Edge (um): | 1408 | Particle: | ACUMIST® B | Above Residual: | 0 | Trans-mission: | 0.95 | |
| Low Edge (um): | 0.0215 | Trans-parency: | Trans-parent | Below Residual: | 0 | RMS Residual: | 4.743% | |
| Residuals: | Disabled | Part. Ref. Index: | 1.55 | | | Flow: | 30% | |
| Num. Channels: | 128 | Part. Shape: | Irregular | Cell ID: | 0226 | Usonic Power: | 40 Watts | |
| Analysis Mode: | S3000 | | | | | Usonic Time: | 120 Sec. | |
| Filter: | Enabled | DB Record: | 553 | Recalc. Status: | Original | Serial Num: | S3293 | |
| Analysis Gain: | Default | Database: C:\Program Files\Microtrac FLEX 10.3.7\Databases\Micronized.MDB | | | | | | |

FIG. 3A

| Size (μm) | % Change | % Pass | Size (μm) | % Change | % Pass | Size (μm) | % Change | % Pass | Size (μm) | % Change | % Pass |
|---|---|---|---|---|---|---|---|---|---|---|---|
| 1408 | 0.00 | 100 | 74.00 | 0.00 | 100 | 3.89 | 3.79 | 74.44 | 0.2040 | 0.00 | 0.00 |
| 1291 | 0.00 | 100 | 67.86 | 0.00 | 100 | 3.57 | 3.83 | 70.65 | 0.1870 | 0.00 | 0.00 |
| 1184 | 0.00 | 100 | 62.23 | 0.00 | 100 | 3.27 | 3.82 | 66.82 | 0.1720 | 0.00 | 0.00 |
| 1086 | 0.00 | 100 | 57.06 | 0.00 | 100 | 2.999 | 3.80 | 63.00 | 0.1580 | 0.00 | 0.00 |
| 995.6 | 0.00 | 100 | 52.33 | 0.00 | 100 | 2.750 | 3.76 | 59.20 | 0.1450 | 0.00 | 0.00 |
| 913.0 | 0.00 | 100 | 47.98 | 0.00 | 100 | 2.522 | 3.68 | 55.44 | 0.1330 | 0.00 | 0.00 |
| 837.2 | 0.00 | 100 | 44.00 | 0.00 | 100 | 2.312 | 3.58 | 51.76 | 0.1220 | 0.00 | 0.00 |
| 767.7 | 0.00 | 100 | 40.35 | 0.00 | 100 | 2.121 | 3.52 | 48.18 | 0.1110 | 0.00 | 0.00 |
| 704.0 | 0.00 | 100 | 37.00 | 0.00 | 100 | 1.945 | 3.48 | 44.66 | 0.1020 | 0.00 | 0.00 |
| 645.6 | 0.00 | 100 | 33.93 | 0.00 | 100 | 1.783 | 3.50 | 41.18 | 0.0940 | 0.00 | 0.00 |
| 592.0 | 0.00 | 100 | 31.11 | 0.00 | 100 | 1.635 | 3.57 | 37.68 | 0.0860 | 0.00 | 0.00 |
| 542.9 | 0.00 | 100 | 28.53 | 0.00 | 100 | 1.499 | 3.64 | 34.11 | 0.0790 | 0.00 | 0.00 |
| 497.8 | 0.00 | 100 | 26.16 | 0.00 | 100 | 1.375 | 3.73 | 30.47 | 0.0720 | 0.00 | 0.00 |
| 456.5 | 0.00 | 100 | 23.99 | 0.00 | 100 | 1.261 | 3.75 | 26.74 | 0.0660 | 0.00 | 0.00 |
| 418.6 | 0.00 | 100 | 22.00 | 0.00 | 100 | 1.156 | 3.70 | 22.99 | 0.0610 | 0.00 | 0.00 |
| 383.9 | 0.00 | 100 | 20.17 | 0.00 | 100 | 1.060 | 3.53 | 19.29 | 0.0560 | 0.00 | 0.00 |
| 352.0 | 0.00 | 100 | 18.50 | 0.00 | 100 | 0.972 | 3.26 | 15.76 | 0.0510 | 0.00 | 0.00 |
| 322.8 | 0.00 | 100 | 16.96 | 0.00 | 100 | 0.892 | 2.93 | 12.50 | 0.0470 | 0.00 | 0.00 |
| 296.0 | 0.00 | 100 | 15.56 | 0.00 | 100 | 0.818 | 2.53 | 9.57 | 0.0430 | 0.00 | 0.00 |
| 271.4 | 0.00 | 100 | 14.27 | 0.00 | 100 | 0.750 | 2.10 | 7.04 | 0.0390 | 0.00 | 0.00 |
| 248.9 | 0.00 | 100 | 13.08 | 0.00 | 100 | 0.688 | 1.67 | 4.94 | 0.0360 | 0.00 | 0.00 |
| 228.2 | 0.00 | 100 | 12.00 | 0.00 | 100 | 0.630 | 1.27 | 3.27 | 0.0330 | 0.00 | 0.00 |
| 209.3 | 0.00 | 100 | 11.00 | 0.20 | 100 | 0.578 | 0.88 | 2.00 | 0.0300 | 0.00 | 0.00 |
| 191.9 | 0.00 | 100 | 10.09 | 0.43 | 99.80 | 0.530 | 0.59 | 1.12 | 0.0279 | 0.00 | 0.00 |
| 176.0 | 0.00 | 100 | 9.25 | 0.75 | 99.37 | 0.486 | 0.35 | 0.53 | 0.0255 | 0.00 | 0.00 |
| 161.4 | 0.00 | 100 | 8.48 | 1.14 | 98.62 | 0.446 | 0.18 | 0.18 | 0.0234 | 0.00 | 0.00 |
| 148.0 | 0.00 | 100 | 7.78 | 1.61 | 97.48 | 0.409 | 0.00 | 0.00 | | | |
| 135.7 | 0.00 | 100 | 7.13 | 2.07 | 95.87 | 0.375 | 0.00 | 0.00 | | | |
| 124.5 | 0.00 | 100 | 6.54 | 2.51 | 93.80 | 0.344 | 0.00 | 0.00 | | | |
| 114.1 | 0.00 | 100 | 6.00 | 2.89 | 91.29 | 0.315 | 0.00 | 0.00 | | | |
| 104.7 | 0.00 | 100 | 5.50 | 3.19 | 88.40 | 0.289 | 0.00 | 0.00 | | | |
| 95.96 | 0.00 | 100 | 5.04 | 3.44 | 85.21 | 0.265 | 0.00 | 0.00 | | | |
| 88.00 | 0.00 | 100 | 4.62 | 3.61 | 81.77 | 0.243 | 0.00 | 0.00 | | | |
| 80.70 | 0.00 | 100 | 4.24 | 3.72 | 78.16 | 0.223 | 0.00 | 0.00 | | | |

FIG. 3B

WAX DISPERSION FORMULATIONS, METHOD OF PRODUCING SAME, AND USES

CROSS REFERENCE TO RELATED APPLICATION

This application claims the benefit of U.S. provisional patent application No. 61/058,027 filed on Jun. 2, 2008, which is incorporated herein by reference in its entirety.

FIELD OF THE INVENTION

The invention relates to aqueous wax dispersions useful as surface modifiers for primers, paints, inks and coatings, lubricants, mold release and other applications. More particularly, the invention pertains to aqueous particulate wax dispersions useful as surface modifiers to provide improved properties in primer, paint, ink and other coating formulations.

DESCRIPTION OF THE RELATED ART

In the paint and coating industries, natural and synthetic additives play an important role in the performance quality of a product, contributing desirable surface properties, improved coating integrity and surface appearance of a final coating product, as well as aiding down stream processing of coated products and extending their service life. Although comprising only a small part of a formulation, an additive can achieve a significant improvement in the properties of the overall formulation at a low dosage and cost, providing enhanced product performance and value. As performance demands on surface modifiers continue to grow, end-users in these industries also continue to expect lower costs, which have led to thinner applied films and faster line speeds. Additionally, as the $4 billion global additives industry evolves, there is an increasing demand for water-based additive dispersions that are free of environmentally harmful surfactants, have zero or low volatile organic compound (VOC) content, and that are free of antifoams and defoamers.

Among the many additives available today, natural and synthetic waxes are capable of satisfying such needs in these industries, imparting improved surface modifying properties to paints and coatings in the form of environmentally friendly, aqueous wax dispersions. Aqueous dispersions of micronized, particulate waxes are particularly useful since the very small particle size allows the particles to be thoroughly distributed throughout the water base, improving the effectiveness and efficiency of the wax. Aqueous dispersions of micronized, particulate waxes may be produced using microfluidics technology, which employs devices that are capable of handling very small volumes of liquid, i.e. in the microliter/nanoliter range, by passing the fluids through channels with dimensions of from about 1 µm to 500 µm. At this size scale, factors that influence the behavior of fluids are different from those at larger scales. For example, surface forces become an increasingly dominant factor for microscale systems compared to macro-scale systems. The large surface forces, high shear and extensional rates (e.g., low Reynolds number and high Weissenberg number, respectively), arising between the fluid and the micro-channels may make otherwise useful large-scale approaches and structures useless or inoperable at micro-fluidic scales. Many useful particle size reduction methods and apparatuses are known in the art, including homogenizers, rotator/stators, and media mills, although some techniques are better than others. As the size of the fluid conduits decrease, it becomes more difficult to control particle surface wettability, which is important in aqueous wax dispersions.

Micronized, particulate waxes are known to provide desirable surface properties such as high levels of rub, mar, scratch and abrasion resistance, as well as improved slip, gloss control and anti-blocking/offsetting properties in primer, paint, ink and other coating formulations. As used herein, "micronization" is the process of reducing the mean average diameter of wax particles, typically by friction or particle to particle collisions and fracture, and a "micronized" wax in the dispersions of the invention are particulate waxes having a mean average (Mv) particle size that has been reduced to only a few microns in diameter, which is described more specifically below.

The ability of a particulate wax additive to protect and enhance the surface of paints and coatings is directly related to the characteristics of the wax. For example, the durability of a coating may be determined by the coefficient of friction (COF), hardness and toughness of the wax, wax type, wax molecular weight and wax dosage in the coating dispersion. The toughness of a wax increases with increasing molecular weight, density and crystallinity of the wax. Wax density affects the stability of the dispersion in a coating composition, as the closer the density of the wax is to the density of the coating material in which the wax is mixed, the better the stability. The solubility properties of a wax are also relevant factors. Micronized, particulate waxes most commonly used in ink, coating and paint applications must remain insoluble in the ink, coating or paint formulation at room temperature (25° C.) to prevent swelling of the wax. The higher the molecular weight and density, the higher the insolubility. Additionally, when added to a coating material, these waxes have particle sizes in the range of about 0.1 µm to about 50 µm. To protect the integrity of a coating film, the wax should remain insoluble to maintain its original particle size and the original particle size distribution during product storage. This will prevent the formation of defects in applied coating films, which defects may occur if the wax migrates to the film surface during application and/or the curing process of the coating composition onto a surface.

The size of the wax particles in particulate wax dispersions is another relevant consideration that is influenced by coating thickness, application parameters and cure schedule of the coating material. In general, the smaller the particle size, the less potential for defects. Particularly, film defects may be avoided when wax particles are smaller in size than the wet film thickness of a coating. Also, the smaller the wax particles, the greater the number of particles per unit weight and the larger their total surface area, thereby increasing performance of a coating as the particles bloom to the coating surface. Large particles, in contrast, may cause film defects or product failure. Particle size, particle size distribution, particle morphology, and refractive index of the wax also affects the gloss and haze properties of a film.

The effectiveness of a wax as a surface modifier also depends on the wettability of the wax in the selected paint, ink or other coating materials. Specifically, the effectiveness of a micronized wax additive in water-based paints, water-based inks and other water-based coatings is complicated by inadequate wettability of waxes which are insoluble in water. To compensate for this problem, it is known to incorporate a dispersing agent, such as a surfactant, in an aqueous wax dispersion to improve the wettability of the wax particles. For example, U.S. Pat. No. 5,743,949 teaches aqueous wax dispersions that include polymeric carbohydrate dispersing agents such as water-soluble alkylated or hydroxyalkylated cellulose ethers, such as methylcellulose or hydroxyethylcellulose, or alkali metal celluloses, such as sodium carboxymethylcellulose. Surfactants are also useful with non-wax polymer dispersions in water. For example, U.S. patent application publications 2005/0100754 and 2007/0292705 teach non-wax, polyolefin resin dispersions in water that incorporate a dispersing agent such as a carboxylic acid, a carboxylic acid salt, a surfactant, and others. The resin dispersions described in these publications are useful for coating onto substrates to provide the substrates with water, oil or chemical resistance, or as a binder for an ink or for a coating composition. U.S. Pat. No. 7,307,042 and European patent application publication EP 1806237 both teach non-wax, resin emulsions that serve as protective layers for thermal recording materials, where the resin emulsions may incorporate a surfactant as an emulsifying agent.

Nevertheless, in the current state of the art, known aqueous wax dispersions suffer from significant undesirable disadvantages and there remains a constant need in the art for improvement. For example, the dispersions of U.S. Pat. No. 5,743,949 comprise a blend of a micronized wax, water and a viscous cellulose-based dispersing agent. The viscous cellulose-based dispersing agent acts as a lattice that suspends the wax particles in the water and raises the viscosity of the dispersion. This is particularly illustrated in Example 20, where the lowest viscosity dispersion is disclosed having a wax concentration of 44.4% with a viscosity of 670 mPas (670 centipoise). It would be desirable to provide dispersions with comparable wax concentrations but with significantly lower viscosities, having a minimal impact on the viscosity of the coating material after addition. Another deficiency in U.S. Pat. No. 5,743,949 involves the means by which dispersions are formed. Specifically, by introducing waxes into water in micronized powder form, i.e. after micronizing the wax, particles agglomerate or clump together, and fail to yield complete or substantially complete wetting of all the dispersed particles with the dispersing agents and thus produces a poor quality dispersion with low stability over time. Complete or substantially complete wetting of wax particles is desirable because a wax, though water insoluble, may be wettable by water for ease of incorporation into formulations and to prevent separation of the wax from the water medium.

Particle agglomeration and insufficient particle wetting is also a problem with polymeric, non-wax, resin emulsions, such as those described in U.S. patent application publications 2005/0100754 and 2007/0292705, U.S. Pat. No. 7,307,042 and European patent application publication EP1806237, all of which teach forming dispersions by mixing molten, non-wax, thermoplastic resins in an aqueous medium with a dispersing agent. These resin dispersions have significantly different properties than waxes which make them unsuitable as efficient additives for coating materials such as paints and inks. For example, waxes melt or soften without decomposing at temperatures above about 40° C., usually converting to a molten, low-viscosity state between about 50° C. and 150° C. and being virtually free from ash-forming compounds, which distinguishes them from oils and resins. Importantly, waxes are also non-stringing and generally do not form stand-alone films, unlike resins and plastics. In contrast, upon application onto a substrate, the resin particles of a resin dispersion will coalesce or cure and form a stand-alone film or a film on a suitable substrate, unlike wax additives. Waxes only modify the surface properties of a film, and do not degrade the mechanical properties of films formed from coating compositions, such as paint or ink compositions, that include the wax particles. Resins will also blend or crosslink with coating materials such as paints, inks or other coating materials, altering the physical properties of the final coating composition, such as the adhesiveness of a film to a substrate. Thus, while resin dispersions are useful as binders for inks or coating materials, they are not qualified as surface conditioning additives for the same coating materials. Surface conditioning additives, such as waxes, do not alter the film forming properties of the base coating material and thereby exist in a coating composition as independent, autonomous wax particles throughout the life cycle of the coating. In the life cycle of the coating composition, the wax is first randomly suspended in the wet coating composition, then is dispersed throughout the film during drying or curing and, preferably, with the majority of wax particles are at the surface of the final dried film. Therefore, the wax particles are added to the base coating material (e.g. ink or paint) for the purpose of modifying the surface properties of coating films, unlike oils and resins.

Accordingly, it is desirable to provide low viscosity, aqueous particulate wax dispersions with high solids concentrations and with substantially no agglomeration of the wax particles and/or wherein the surfaces of substantially all of the wax particles are substantially completely coated (i.e. wetted) with a dispersing agent to enhance the quality and long term stability of the dispersion. It is also desirable to have substantial homogeneity, wherein the dispersion does not separate, thus maintaining wax particle homogeneity and exhibiting product stability during storage prior to use. It is further desirable for a wax dispersion to comply with the applicable U.S. Food and Drug Administration (FDA) regulations for use in food packaging applications. With only a minimal amount of a dispersing agent, the present invention provides a solution to these needs in the art, and achieves exceptional wax particle wetting

SUMMARY OF THE INVENTION

The invention provides an aqueous wax dispersion comprising:
a) water;
b) at least one particulate wax dispersed within the water, wherein the particulate wax comprises particles having an average particle size of from about 0.1 µm to about 6 µm, wherein substantially all of the wax particles have a particle size of about 20 µm or less, and wherein the particulate wax comprises from about 5% to about 45% by weight of the dispersion; and
c) from greater than 0% to about 5% by weight of a dispersing agent based on the weight of the particulate wax; which dispersing agent coats the surfaces of at least some of the wax particles; and wherein the dispersion has a viscosity of about 100 cps or less at about 25° C. at a wax concentration of about 10% by weight of the dispersion, and a viscosity of about 200 cps or less at about 25° C. at a wax concentration of about 45% by weight of the dispersion, and wherein there is substantially no agglomeration of the wax particles.

The invention also provides a method of producing an aqueous wax dispersion comprising:
a) combining at least one particulate wax comprising a plurality of wax particles having an average particle size of greater than about 6 µm, with water and with at least one dispersing agent to form a mixture; and
b) subjecting the mixture to conditions sufficient to disperse the wax particles in the water and to coat the surfaces of at least some of the wax particles with the dispersing agent; and to reduce the size of the wax particles such that the average wax particle size is from about 0.1 µm to about 6 µm and such that substantially all of the wax particles have a particle size of about 20 µm or less; and thereby producing an aqueous wax dispersion wherein the particulate wax comprises from about 5% to about 45% by weight of the dispersion; wherein the dispersing agent comprises from greater than 0% to about 5% by weight based on the weight of the particulate wax; and wherein the dispersion has a viscosity of about 100 cps or less at about 25° C. at a wax concentration of about 10% by weight of the dispersion, and a viscosity of about 200 cps or less at about 25° C. at a wax concentration of about 45% by weight of the dispersion.

The invention further provides an aqueous wax dispersion produced by a process which comprises:
a) combining at least one particulate wax comprising a plurality of wax particles having an average particle size of greater than about 6 µm, with water and with at least one dispersing agent to form a mixture, the wax having a weight average molecular weight of up to about 13,000; and
b) separating the mixture into a plurality of mixture streams;
c) causing the mixture streams to continuously collide with each other, thereby causing the wax particles to continuously collide with each other, at a pressure and velocity sufficient to generate heat and to result in wax particle size reduction;
d) continuously removing the heat generated by the particle collisions and cooling the mixture to about 5° C. or less; and
e) allowing the mixture stream and wax particle collisions to continue to reduce the average wax particle size to about 0.1 µm to about 6 µm and such that substantially all of the wax particles have a particle size of about 20 µm or less; and also to homogenously disperse the wax particles in the water; and thereby producing an aqueous wax dispersion wherein the particulate wax comprises from about 5% to about 45% by weight of the dispersion; wherein the dispersing agent comprises from greater than 0% to about 5% by weight based on the weight of the particulate wax; and wherein the dispersion has a viscosity of about 100 cps or less at about 25° C. at a wax concentration of about 10% by weight of the dispersion, and a viscosity of about 200 cps or less at about 25° C. at a wax concentration of about 45% by weight of the dispersion; and wherein there is substantially no agglomeration of the wax particles.

A method of producing a dispersion comprising:
a) combining at least one particulate material comprising a plurality of particles with a solvent and with at least one dispersing agent to form a mixture; and
b) subjecting the mixture to conditions sufficient to disperse the particles in the solvent and to coat the surfaces of at least some of the particles with the dispersing agent; and to at least partially reduce the size of the particles and to thereby produce an dispersion wherein the particulate material comprises from about 5% to about 45% by weight of the dispersion; wherein the dispersing agent comprises from greater than 0% to about 5% by weight based on the weight of the particulate material; and wherein the dispersion has a viscosity of about 100 cps or less at about 25° C. at a particulate material concentration of about 10% by weight of the dispersion, and a viscosity of about 200 cps or less at about 25° C. at a particulate material concentration of about 45% by weight of the dispersion.

BRIEF DESCRIPTION OF THE DRAWING

FIGS. 3A-3C illustrate a summary of the particle size data analysis conducted on the dispersion from Example 12.

DESCRIPTION OF THE INVENTION

Figure 1:
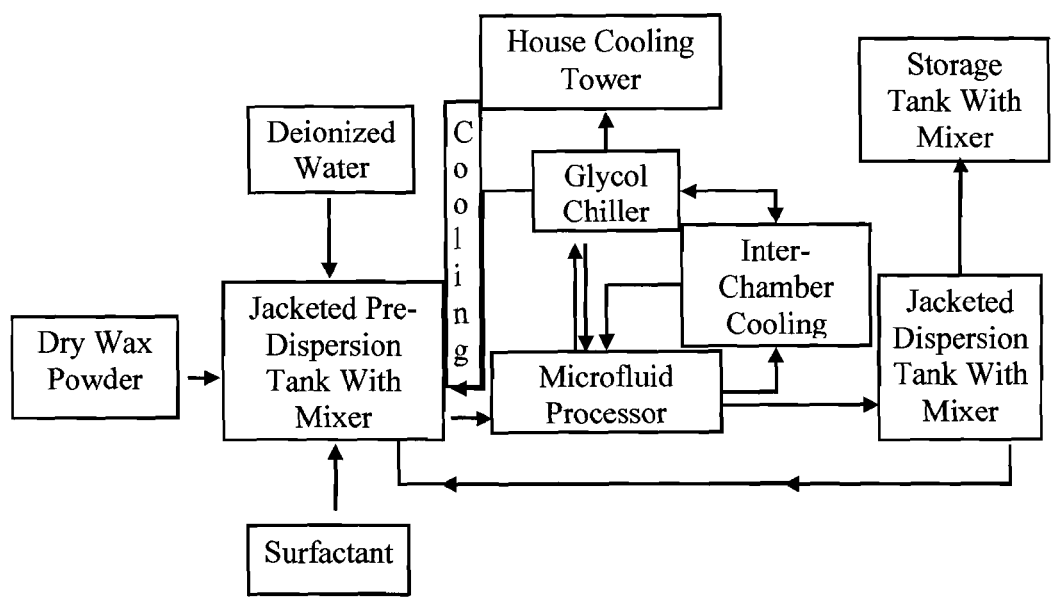
FIG. 1 is a schematic representation of the process in accordance with the invention.

The aqueous wax dispersion formulations of the present invention are environmentally safe, have zero or low VOC content, and are also compliant with the applicable FDA regulations under Title 21 of the Code of Federal Regulations for use in food packaging applications. They are available as stir-in additives for paints, inks and other coating materials, are shelf stable upon storage prior to use and have a minimal impact on the viscosity of the coating material after addition. The dispersions include a low amount of surfactant relative to the wax solids, are free of antifoams and defoamers, and impart improved balance in slip, rub, antiblock, gloss retention and abrasion resistance properties to coating surfaces. The dispersions also aid down stream processing of coated products, extend the service life of the end product and improve the appearance of the end product.

An aqueous dispersion is a dispersion in which the continuous liquid medium is water. Deionized water is preferred, as water with excess hardness can affect the formation of a suitable dispersion. As used herein, an "aqueous wax dispersion" refers to a distribution of wax particles in water. Also, water is preferably the only continuous liquid medium used, and makes up the balance of the dispersion which is neither wax nor the dispersing agent.

As stated above, waxes are generally defined as materials that are solids at room temperature, but melt or soften without decomposing at temperatures above about 40° C. They are generally organic and insoluble in water at room temperature, but may be water wettable and may form creams, gels and/or pastes in some solvents, such as non-polar organic solvents. Waxes may be branched or linear, and may have low crystallinity or high crystallinity. A wax with "low" crystallinity has a crystallinity below about 20%, preferably from about 9% to about 20% crystallinity. A wax with "moderate" crystallinity has a crystallinity of from about 20% to about 40%. A wax with "high" crystallinity has a crystallinity above 40%, preferably from about 70% to about 95%. In preferred embodiments of the invention, the crystallinity of the wax is from about 20% to about 90%.

Waxes also have relatively low polarity. Their weight average molecular weights may range from about 400 to about 25,000 and have melting points ranging from about 40° C. to about 150° C. Preferred waxes have a weight average molecular weight of from about 400 to about 13,000, more preferably from about 400 to about 10,000, and most preferably less than 10,000. Useful waxes also have a preferred polydispersity (Pd) index of from about 1.0 to about 4.0, more preferably from about 1.0 to about 2.5 and most preferably from about 1.0 to about 1.5.

Waxes generally do not form stand-alone films like higher order polymers/resins and generally are aliphatic hydrocarbons that contain more carbon atoms than oils and greases. Another defining property of a wax is its viscosity. Viscosity measures a material's internal resistance to flow, wherein a material with a high viscosity is considered "thicker" and less fluid than a material with a low viscosity. The melt viscosity of waxes may range from low to high, and typically depends on the molecular weight of the wax, the crystallinity, and whether or not the wax is oxidized or copolymerized. Increasing molecular weight and density of the wax increases the melt viscosity of wax, and increasing the crystallinity of the wax decreases the melt viscosity. The friability of a wax, i.e. its affinity to be reduced in particle size by mechanical forces, increases with higher crystallinity and decreases with increasing density and molecular weight of a wax. Oxidized waxes tend to create higher dispersion viscosities in water (e.g. about 300 centipoise (cps) to about 400 cps at room temperature (~25° C.)) than non-oxidized waxes (about 30 cps to about 150 cps at room temperature) in an aqueous dispersion. This is thought to be due to the polar groups intrinsic in the chemistry of oxidized waxes, or attached to the wax surface from the oxidation process and the affinity of the polar groups for hydrogen bonding with water, which increases the resistance to flow of the mixture, causing an increase in the viscosity of the aqueous dispersions. The melt viscosity of waxes above their melting point is typically low. In preferred embodiments of the invention, the preferred waxes have a melt viscosity at 140° C. of from about 5 cps to about 10,000 cps, more preferably from about 5 cps to about 100 cps and most preferably from about 5 cps to about 80 cps.

Viscosity values are measured using techniques that are well known in the art and may be measured, for example, using capillary, rotational or moving body rheometers. A preferred measurement tool is a Brookfield rotational viscometer, commercially available from Brookfield Engineering Laboratories, Inc. of Middleboro, Mass. The viscosity of aqueous wax dispersions and the thixotropic, pseudoplasticity and/or Newtonian Theological behavior of the aqueous wax dispersions are typically measured with a Brookfield rotational viscometer.

Suitable waxes include both natural and synthetic waxes. Suitable waxes non-exclusively include animal waxes, such as beeswax, Chinese wax, shellac wax, spermaceti and wool wax (lanolin); vegetable waxes, such as bayberry wax, candelilla wax, carnauba wax, castor wax, esparto wax, Japan wax, Jojoba oil wax, ouricury wax, rice bran wax and soy wax; mineral waxes, such as ceresin waxes, montan wax, ozocerite wax and peat waxes; petroleum waxes, such as paraffin wax and microcrystalline waxes; and synthetic waxes, including polyolefin waxes, including polyethylene and polypropylene waxes, wax grade polytetrafluoroethylene waxes (PTFE wax-like grades), Fischer-Tropsch waxes, stearamide waxes (including ethylene bis-stearamide waxes), polymerized α-olefin waxes, substituted amide waxes (e.g. esterified or saponified substituted amide waxes) and other chemically modified waxes, such as PTFE-modified polyethylene wax as well as combinations of the above. Of these, the preferred waxes include paraffin waxes, micro-crystalline waxes, Fischer-Tropsch waxes, branched and linear polyethylene waxes, polypropylene waxes, carnauba waxes, ethylene bis-stearamide (EBS) waxes and combinations thereof. Table 1 outlines the properties of these preferred waxes:

The appropriate type of wax to be used in a dispersion for a particular application will depend on what the formulator wants to achieve. For example, waxes having an acid number and/or a saponification ("sap") number greater than zero have reduced hydrophobicity. The higher the acid or sap number, the more hydrophilic the wax. Preferred waxes for use in the invention have an acid number of about 40 or less, more preferably have an acid number of about 30 or less, and most preferably have an acid number of zero. Preferred waxes for use in the invention have a saponification number of about 80 or less, more preferably have a saponification number of about 50 or less, and most preferably have a saponification number of zero. In most preferred embodiment of the invention, both the acid number and the saponification number are zero. Synthetic hydrocarbon polymers and polyolefin homopolymers are typically intentionally made to have no acid or sap number, and thus are the most hydrophobic of all the waxes. If desired, synthetic polyolefin homopolymers may be modified to attach hydrophilic groups to the polymer chain, for example by oxidation, or copolymerization with hydrophilic groups, for example by attaching pendant polar functional groups, such as carboxy or hydroxy groups to induce hydrophilicity and increase the ability of the polymer to be wettable and dispersible in water. Additionally, no emulsions are available for unmodified polyethylene homopolymers having a weight average molecular weight of from about 800 to about 15,000.

In general, hydrophilicity is desired in a wax to improve wettability in water, to achieve the wax-water dispersion easier, and to improve shelf stability of the dispersion. However, once in a coating, hydrophilicity is not desirable because the wax is compatible with polar resins since most resins have the same pendant groups for reactivity and crosslinking, similar to the same groups in hydrophilic waxes, such as carboxy groups, hydroxy groups, ketones and aldehydes. Since the hydrophilic waxes are polar resin compatible, they will become part of the film and will not migrate to the surface during the cure cycle to perform as surface modifiers. They also may work as minor film binders since they have low molecular weights and adversely affect the mechanical properties of the cured film. For example, in the current state of the art, emulsions including hydrophilic waxes having an acid number of 16 or higher and/or a sap number of 16 or higher are known because they are water compatible, easy to emulsify, easy to add to water and provide coatings with good gloss retention. However, these are not preferred as surface modi-

TABLE 1

| Wax | Molecular Weight (Mw) | Crystallinity | Density | Melting Point (° C.) | Penetration Hardness (dmm) | Typical Viscosity (cps) above melting pt. |
|---|---|---|---|---|---|---|
| Paraffin | ~400 | 48 | 0.9 | 50-70 | 10-20 | <20 |
| Micro-Crystalline | ~650 | 75 | 0.96 | 60-90 | 5-30 | <20 |
| Fischer-Tropsch | ~600 | 64 | 0.94 | 95-100 | 1-2 | <20 |
| Branched Polyethylene | 1000-10,000 | 48-62 | 0.91-0.94 | 90-140 | 1-100 | >20-8000 |
| Linear Polyethylene | 1000-10,000 | 55-90 | 0.93-0.97 | 90-140 | <0.5-5 | >10-1000 |
| Polypropylene | 2000-10,000 | >80 | 0.9 | 140-165 | <0.5 | >20-3000 |
| Carnauba | Mixture of low MW materials | >60 | 0.97 | 78-85 | 2-3 | <20 |
| EBS | 593 | unavailable | 0.97 | 135-146 | <5 | <20 | fiers for the purposes described herein. Particularly, the wax particles remain trapped and mixed throughout cured films, thus failing to provide adequate surface protection and having only a minor impact on surface durability regardless of wax dosage in the coatings. Such emulsions also and do not significantly improve the durability, slip, rub and abrasion resistance of the coatings, such as inks and paints. This is partly due to wax hydrophilicity. Accordingly, there is a need for improved aqueous wax particle dispersions, particularly those having a wax particle size of from about 0.1 µm to 6 µm, where the aqueous dispersion is easy to add to coating materials, such as inks and paints, where the wax particles exhibit stability upon standing and remain compatible with their coating materials in a storage can upon standing, but migrate to the surface upon curing of the material due to their physical incompatibility with the polar-hydrophilic material.

Important factors to consider include the primary performance property required, any additional or secondary properties desired, the formula chemistry including media, the application method and cure environment, and the wet and dry film thicknesses, as well as cost. Wax properties that will influence the behavior of an aqueous wax dispersion include the intrinsic chemistry of the wax, the molecular weight and molecular weight distribution of the wax, the degree of branching of the wax, and the wax particle morphology, including wax particle size and wax particle size distribution. Other considerations are the wax crystallinity, density, coefficient of friction, hardness, melting point, viscosity, hydrophobicity and insolubility in solvents at room temperature. One or more of these wax properties will influence product properties such as toughness, abrasion resistance, mar resistance, rub resistance, slip/non-slip, gloss or matting control and anti-blocking/offsetting, as well as ease of formulation incorporation and compatibility with a coating material. For example, as stated above, wax density affects the stability of the dispersion in a coating composition, as the closer the density of the wax is to the density of the coating material in which the wax is mixed, the better the stability. In preferred embodiments of the invention, the wax has a density (as determined by ASTM D-1505) of from about 0.5 grams per cubic cm (g/cm$^3$) to about 1.5 g/cm$^3$, more preferably from about 0.8 g/cm$^3$ to about 1.0 g/cm$^3$, and most preferably from about 0.95 g/cm$^3$ to about 1.0 g/cm$^3$. The insolubility of a wax in a coating material, whether water-based or solvent-based, may prevent swelling of the wax, and the higher the molecular weight and density, the higher the insolubility. The coefficient of friction of a wax, or more particularly of a wax coating on a surface, is a comparative value indicating the ability of a film surface to move against itself or another surface. The higher the coefficient of friction, the more difficult it is for an object to slip or move on the surface. The desired coefficient of friction of a surface may vary depending on the demands of the formulator or end user for a particular application, so the selection of a wax for COF purposes is application specific. However, in the anticipated typical applications of the present invention, the most preferred waxes of the invention will provide a dried and/or cured coating surface with a low coefficient of friction, so the coatings will thereby exhibit high slip which improves the surface performance of the film, such as release properties and anti blocking, and the durability of a product film by causing abradants to slip off the film surface.

Most of the waxes described herein will reduce the coefficient of friction of a surface, including polyethylene wax, wax-grade PTFE, paraffin wax and Fischer-Tropsch waxes. In contrast, polypropylene waxes will increase the coefficient of friction of a surface.

Useful waxes of the invention preferably have a hardness of from about 0.01 dmm to about 10 dmm, more preferably from about 0.5 dmm to about 5 dmm, more preferably from about 0.5 dmm to about 2 dmm, and most preferably below 2.0 dmm as determined by ASTM D-5. The hardness of a wax is the ability of the wax surface to resist cutting, indentation or penetration. A wax with high hardness improves product film durability by preventing objects from penetrating the film. Useful waxes of the invention preferably have a hardness of from about 0.01 dmm to about 10 dmm, more preferably from about 0.5 dmm to about 5 dmm, more preferably from about 0.5 dmm to about 2 dmm, and most preferably below 2.0 dmm as determined by ASTM D-5. Wax toughness, or the ability of a wax to absorb energy without degrading or fracturing, is directly related to its physical properties, such as molecular weight, hardness and density. Waxes with greater toughness will exhibit less damage and wear due to object penetration. Toughness increases with increasing molecular weight, density and hardness. Preferred waxes will also have a melting point of from about 40° C. to about 150° C., more preferably from about 80° C. to about 150° C., and most preferably from about 100° C. to about 150° C., as determined either by differential scanning calorimetry (DSC) or by ASTM D-3954.

Compared to hydrophobic waxes, hydrophilic waxes may be easier to stabilize in water because of their water wettability. However, due to their increased affinity for water, hydrophilic waxes may not be easier to micronize because the hydrophilic groups adversely affect the crystallinity of the polymer, decreasing its friability and ability to micronize and stabilize in water dispersions. Hydrophobicity of a wax is important for the wax to remain in particulate form in the aqueous medium, to prevent swelling of the wax, and to prevent an increase in the viscosity of a wax dispersion due to hydrogen bonding of hydrophilic groups with water. This allows the wax to effectively perform as a surface modifier.

Preferred waxes are non-oxidized polyolefin waxes. More preferred are polyolefin homopolymer waxes. Particularly preferred waxes include A-C® polyolefin homopolymer and copolymer waxes, and ACUMIST® waxes, which are commercially available from Honeywell International Inc. of Morristown, N.J. Preferred non-polyolefin waxes and wax blends non-exclusively include carnauba waxes, amide waxes, montan waxes, and combinations thereof. Most preferred are polyethylene homopolymer waxes, particularly a polyethylene homopolymer wax having a weight average molecular weight of from about 400 to about 10,000, more preferably from about 800 to about 4,000. Polyethylene homopolymer waxes are most preferred for their attractive properties including excellent toughness, chemical resistance, low coefficient of friction, near-zero moisture absorption and good ease of processing. Additionally, homopolymers are more crystalline than copolymers, as explained above, and thus are more desirable. See Table 2 which compares typical properties of the preferred ACUMIST® and A-C® polyethylene waxes available from Honeywell International Inc. with a typical polypropylene wax, typical polytetrafluoroethylene (PTFE) modified polyethylene wax and typical Fischer-Tropsch wax:

TABLE 2

| Polyolefin Wax | Mettler Drop Point (ASTM D-3954) | Hardness (dmm) (ASTM D-5) | Density (g/cc) (ASTM D-1505) | Acid Number (mg KOH/g) (ASTM D-1386) | FDA Compliance |
|---|---|---|---|---|---|
| ACUMIST ® "A" Series Oxidized Polyethylene Wax | 137° C. (279° F.) | <0.5 | 0.99 | 26-40 | 21 CFR 175.180 |
| ACUMIST ® "B" Series Polyethylene Wax | 126° C. (259° F.) | <0.5 | 0.96 | N/A | 21 CFR 175.300<br>21 CFR 176.170<br>21 CFR 175.180 |
| ACUMIST ® "C" Series Polyethylene Wax | 121° C. (250° F.) | 1.0 | 0.95 | N/A | 21 CFR 175.300<br>21 CFR 176.170<br>21 CFR 175.180 |
| ACUMIST ® "D" Series Polyethylene Wax | 118° C. (244° F.) | 2.0 | 0.94 | N/A | 21 CFR 175.300<br>21 CFR 176.170<br>21 CFR 175.180 |
| A-C ® 1591 Polyethylene Wax | 109° C. (228° F.) | 2.5 | 0.93 | N/A | 21 CFR 175.300<br>21 CFR 176.170<br>21 CFR 175.180 |
| A-C ® 1571 Polyethylene Wax | 106° C. (223° F.) | 4.0 | 0.92 | N/A | 21 CFR 175.300<br>21 CFR 176.170<br>21 CFR 175.180 |
| Polypropylene Wax | 145° C. (293° F.) | <0.5 | 0.91 | N/A | — |
| PTFE Modified Polyethylene Wax | (126° C.) (259° F.) | <0.5 | 0.98-1.10 | N/A | 21 CFR 175.300<br>21 CFR 176.170<br>21 CFR 175.180 |
| Fischer-Tropsch Wax | 114° C. (237° F.) | 1.0 | 0.94 | N/A | — |

The wax particles and water are mixed together along with one or more dispersing agents that assist in dispersing the wax particles in the water, and thereby form a wax mixture. As used herein the term "dispersing agent" is a material that coats the wax particles to improve the water wettability and stability of the particles within the water. These include surface-active agents, also referred to as surfactants, which reduce the interfacial tension between two immiscible materials.

Any suitable dispersing agent may be used, as would be determined by one skilled in the art, including one or more carboxylic acids, such as a fatty acid such as montanic acid, a carboxylic acid salt, a carboxylic acid ester, a salt of a carboxylic acid ester, alkyl ether carboxylates, petroleum sulfonates, sulfonated polyoxyethylenated alcohol, sulfated or phosphated polyoxyethylenated alcohols, polymeric ethylene oxide/propylene oxide/ethylene oxide dispersing agents, primary and secondary alcohol ethoxylates, alkyl glycosides, alkyl glycerides, as well as surfactants, including anionic, non-ionic or cationic surfactants, as well as combinations of any of the above. Generally, any surfactant may be used herein to assist in wax particle wetting, but cationic surfactants are less used in ink and coatings formulations because of interactions with anionic nature of coating resins. Preferred surfactants for use herein are anionic and non-ionic surfactants. Most preferably, the dispersing agent comprises an anionic surfactant. Also suitable are combinations of these dispersing agents, such as a combination of one or more anionic surfactants and one or more non-ionic surfactants. However, the dispersions are preferably free of any environmentally harmful surfactants, such as alkyl phenol ethoxylate surfactants. Other dispersing agents not specifically described herein may also be useful. However, it is preferred that useful dispersing agents do not increase the dispersion viscosity to outside the parameters specified herein. Accordingly, the polymeric carbohydrate derivative dispersing agents or other cellulose-based dispersing agents that are described in U.S. Pat. No. 5,743,949 are explicitly excluded from this invention.

The selection of the most appropriate surfactant or surfactant mixture is directly dependent on the hydrophobicity or hydrophilicity of the wax which it coats, as well as the solubility of the surfactant in water. A useful parameter in the selection of an non-ionic surfactant is the hydrophilic-lipophilic balance (HLB) value of a surfactant. The HLB value is an empirical measure, as determined either by the well known Griffin method (for non-ionic surfactants) or Davies method (for other surfactants), of the degree to which the surfactant is either hydrophilic or lipophilic, In general, surfactants with lower HLB values are more hydrophobic and have greater solubility in oils, while materials with higher HLB values are more hydrophilic and have greater solubility in aqueous solutions. More specifically, hydrophilic surfactants are generally considered to be compounds having an HLB value greater than about 10, while hydrophobic surfactants are generally considered to be compounds having an HLB value less than about 10. For more hydrophilic waxes, a surfactant with a lower HLB value is preferred. For more hydrophobic waxes, a surfactant with a higher HLB value is preferred. The amount of surfactant needed will also depend of the wax concentration in the dispersion, the particle size of the wax, and the total surface area of the wax particles dispersed in water. Overall, preferred surfactants herein have an HLB value from about 9 to about 15, more preferably from about 12 to about 15 and most preferably from about 13 to about 15, as determined by either the Griffin or Davies methods.

Useful non-ionic dispersing agents include those with HLB values between from about 9 to about 15, such as TRITON® X-100, a polyoxyethylene octyl phenyl ether surfactant commercially available from The Dow Chemical Company of Midland, Mich. having an HLB value of 13.5. However, this surfactant contains an alkyl phenol structure and is less desirable for environmental reasons. Preferred anionic surfactants non-exclusively include sulfosuccinate surfactants, such as dioctyl sodium sulfosuccinate (DSS). Other anionic surfactants, such as sodium alkanesulfonate, sodium olefinsulfonate, sodium lauryl alcohol ether sulfate, sodium oleic acid methyltauride, sodium oleic acid isothionate, sodium oleic acid sarcoside may be useful as well. For anionic dispersing agents for use with hydrophobic polyethylene homopolymer waxes, the most preferred are anionic sulfosuccinate surfactants, particularly a DSS. Particularly preferred are anionic sulfosuccinate surfactants commercially available from Cytec Industries of West Paterson, N.J. under their trademark AEROSOL®, including AEROSOL® OT-100 which is a 100% solid DSS surfactant. Dioctyl sodium sulfosuccinate is useful because, although it exhibits a very low affinity for water and only 2% solubility in water, it reduces the surface tension of water at 1% concentration to below 30 dynes/cm. In addition a 1% DSS mixture in water exhibits an interfacial tension with mineral oil of below 2.0 dynes/cm. Since mineral oil surfaces are similar in hydrophobicity to polyethylene homopolymer waxes, the use of DSS surfactants will produce dispersions with low foam, low viscosity and excellent dispersion stability. Also useful are aqueous blends of AEROSOL® OT 100% solid DSS surfactant with alcohol, such as 2-ethylhexanol, which is used as a component to produce Cytec OT-NV (an anti-stat), or ethanol, which is used as a component to produce Cytec OT-75 (a blend with 20% water and 5% ethanol). However, alcohol can cause some instability of the wax dispersed in the water, so alcohol free blends are most preferred. Surfactants with low levels of alcohol (equal to or less than 1% in the surfactant, such as Cytec OT-NV), or solid Aerosol OT-100% are preferred in order to produce zero VOC dispersions, as determined by ASTM method #24.

In order to effectively improve the water wettability and stability of the wax particles within the water, it is important that the wax mixture is processed such that the surfaces of substantially all of the wax particles are substantially completely coated with the dispersing agent. As used herein, "substantially all" and "substantially completely" mean at least about 90%, more preferably at least about 95% and most preferably at least about 99% of the wax particles and wax particle surface area, respectively. According to the process of the invention, this is achieved with only a small amount of dispersing agent relative to the weight of the particulate wax. Particularly, the dispersing agent or agents are present in the aqueous wax dispersions in an amount of from greater than 0% to about 5% by weight relative to the weight of the wax. More than one dispersing agent may be used, but the dispersions preferably include only one, and the combined total quantity of all dispersing agents is preferably no greater than 5% by weight.

As used herein, a "wax mixture" is defined as a blend that has not been processed in a homogenizer according to the invention, and which comprises water, a dispersing agent and a plurality of wax particles. The wax particles preferably have an initial average particle size greater than about 6 μm, and wherein a plurality of the particles are preferably below 1000 μm, and more preferably have a "top size" (maximum) of about 50 μm or less. The maximum particle size may be restricted by the capabilities of the processor apparatus employed. For example, if a microfluid processor incorporating 200 μm diameter micro-channels is employed, the wax particles should have a top size of less than 200 μm. The wax also preferably has substantially no heat history. The heat history of a polymer is the accumulated amount of heat to which the polymer has been exposed to during processing operations, which affects the molecular structure of the polymer. A polymer having a heat history has undergone at least some deterioration and/or molecular rearrangement, affecting its properties and resulting in unpredictable behavior. A polymer that has never been exposed to heat has no heat history, and has more predictable behavior.

An "aqueous wax dispersion" is defined herein as a dispersion comprising water, a dispersing agent and micronized wax particles that have been micronized in a homogenizer according to the invention, preferably to have an average particle size of about 0.1 μm to about 6 μm and preferably where substantially all (95% or more, preferably 99% or more) of the particles have a particle diameter of less than about 20 μm. Wax particle size in an aqueous wax dispersion is a relevant factor that has an impact on the properties of a coating composition and coating end product. To avoid film defects, wars particles should be smaller in size than the wet film thickness of a coating, and the smaller the particle size the lower the potential for defects. The smaller the wax particles, the greater the number of particles per unit weight and the larger their total surface area. In preferred embodiments of the invention, after micronization, the wax particles of the aqueous dispersions have an average particle size of from about 0.1 μm to about 6 μm, more preferably from about 1 μm to about 6 μm and even more preferably from about 1 μm to about 3 μm. However, it should be understood that the process of the invention, where particulate waxes are processed in a homogenizer together with water and a dispersing agent to reduce the wax particle size, while continuously cooling the wax-water-dispersing agent mixture to a temperature below 50° C. (preferably 2° C. to about 50° C.), may also be more broadly used to form dispersions having larger particles sizes. As such, according to a process of the invention, aqueous wax dispersions may be produced where substantially all (95% or more, preferably 99% or more) of the wax particles are preferably reduced to have a mean average particle size of below 1000 μm, more preferably below about 50 μm, more preferably from about 0.1 μm to about 20 μm, still more preferably from about 0.1 μm to about 12 μm, still more preferably from about 0.1 μm to about 6 μm, even more preferably from about 1 μm to about 6 μm and most preferably from about 1 μm to about 3 μm. In such embodiments, said waxes need not necessarily be considered "micronized" and the only limitation to an acceptable particle size would be the physical and mechanical limitations of the homogenizer apparatus. Accordingly, the invention encompasses all aqueous wax dispersions including 0% to about 5% by weight of at least one dispersing agent and a particulate wax of any particle size where the dispersion has a viscosity of about 100 cps or less at about 25° C. at a wax concentration of about 10% by weight of the dispersion, and a viscosity of about 200 cps or less at about 25° C. at a wax concentration of about 45% by weight of the dispersion, and wherein there is substantially no agglomeration of the wax particles. The process of the invention, allowing for the continuous cooling of the homogenizer, may also be useful for resinous (polymeric), non-wax particles without molecular weight limitations, so long as they are capable of being processed by the homogenizer apparatus.

Upon application of a coating, containing wax particles as a minor component, onto a substrate, the wax particles move and "float" to the surface of the coating in air dry coating applications. During a high temperature cure cycle, i.e. a cure above the melting point of the wax, they will bloom to the film surface. In either instance, the wax will modify film surface properties and film appearance. Particle sizes of the wax additive component may be measured on a MICROTRAC® 3500 laser diffractometer, commercially available from Microtrac Inc. of Montgomeryville, Pa., or another suitable device.

The aqueous wax dispersions may be produced by processing a mixture of water, the dispersing agent and a plurality of wax particles having a mean average (Mv) particle size (i.e. average diameter) above 6 µm in a homogenizer apparatus that is capable of pulverizing particles under conditions sufficient to reduce the mean average particles size to below 6 µm, as they are mixed with the water. The water, dispersing agent and wax particles may be pre-mixed before being transferred into the homogenizer apparatus and micronization of the wax particles is effected in the homogenizer, allowing the particles to be wetted by the dispersing agent. The homogenizer may then be operated to micronize the particles.

It has been found herein that exceptional wax particle wettability may be achieved using high pressure microfluidic homogenizers, rather than other devices. Microfluidic homogenizers are manufactured very precisely to include chambers containing very small "micro-channels", having channel diameter sizes of from about 75 µm to about 200 µm in, which are typically made from diamond or high grade porcelain materials. Useful homogenizers herein should include micro-channels that are suitable to allow the aqueous wax mixtures to flow through said channels without clogging due to the wax particles. Any commercially available high-pressure homogenizer may be used herein, such as MICROFLUIDIZER® homogenizers, commercially available from Microfluidics Corp. of Newton, Mass.; NANOMIZER™ homogenizers commercially available from Nanomizer, Inc. of Tokyo, Japan. and ULTIMIZER™ homogenizers commercially available from Sugino Machine Ltd. of Toyama, Japan; SONIFIER® homogenizers commercially available from Branson Ultrasonics Corp. of Danbury, Conn.; the DeBEE™ family of homogenizers commercially available from Bee International, Inc. of South Easton, Mass., or various others.

Most preferably, the process of the invention is conducted utilizing the M-110EH-30 MICROFLUIDIZER® processor from Microfluidics Corp., which can achieve continuous operating pressures of up to 40,000 psi (275.8 MPa). The M-110EH-30 MICROFLUIDIZER® processor directs the mixture through two or more (typically two) chambers containing precisely defined micro-channels under high pressure via an intensifier pump, separating the mixture into a plurality of mixture streams (typically two) and causing the mixture streams to collide with each other within the interaction chamber. The collision of the mixture streams causes the wax particles within the mixture to collide with each other. The streams also collide with the walls of the channels in the interaction chamber. These particle collisions occur at high pressure and high velocity such that the wax particles fracture upon impact, resulting in wax particle size reduction, i.e. wax particle micronization. The M-110EH-30 MICROFLUIDIZER® processor is capable of running at a pressure of at least about 14,000 psi, more preferably 25,000 psi and most preferably at its maximum pressure of about 30,000 psi, resulting in high velocity collisions of the mixture streams. An undesirable side-effect of the high speeds is the generation of heat, which may cause melting of the wax particles, thereby reducing friability of the wax particles and inhibiting wax particle size reduction. In order to overcome this problem, the generated heat should be continuously removed. Removal of the generated heat of reaction prevents melting of the wax particles, reduces or eliminates surface tackiness of the fractured wax particles, avoids particle agglomeration, maintains wax crystallinity and friability of the wax particles throughout the process, thus allowing particle size reduction to continue. Accordingly, cold processing of the dispersion is preferred. Preferably, the mixture streams are immediately and continuously cooled to a temperature above 0° C. to below about 50° C., more preferably to a temperature from about 2° C. to about 50° C., more preferably to a temperature above 0° C. to about 5° C., and most preferably to a temperature of from about 2° C. to about 5° C., using any sufficient cooling means, including internal and/or external heat exchangers that are appropriately positioned to remove heat, such as between the inter-chambers of the processor, or another location where heat is specifically generated within the apparatus, as would be readily determinable by the user. If the temperature rises above 50° C., the viscosity of the dispersion may increase to where they become gels, creams and/or pastes, which is not desired herein because the streams will no longer remain liquid to allow further processing. The particles become unable to collide with each other, causing wax particle size reduction to cease, and causing the final product to exhibit large wax particle sizes and undesirable paste-like viscosities. Such a substance does not possess the desired surface modifying properties as described herein. Preferred are dispersions that are formulated as non-gelled, milky liquids, as described in the Examples.

A heat exchanger may be a standard component of the selected processor. Such a heat exchanger may be connected to an external, high capacity, low temperature chiller to cool the aqueous dispersion stream after it has returned to ambient atmospheric pressures. Suitable chillers, such as liquid cooled chillers, are commercially available, for example, from Budzar Industries of Willoughby, Ohio. Additionally, internal heat exchangers (e.g. an inter-loop heat exchanger) typically cannot withstand processing at high pressures, so they typically must be designed to withstand high pressure. Accordingly, other means must be used to remove heat while at or above such high pressures, such as a supplemental heat exchanger. For example, the M-110EH-30 MICROFLUIDIZER® processor does not incorporate adequate standard heat exchangers and one or more supplemental heat exchangers must be provided. Accordingly, a supplemental heat exchanger that is capable of withstanding pressures up to about 30,000 psi, and preferably engineered with a rating to withstand 60,000 psi of pressure applied by the liquid steam being passed though said heat exchanger (for safety requirements), is preferably positioned between the inter-chambers of the processor. This supplemental heat exchanger may be connected to a high capacity chiller if the dispersion has exited the high pressure loop of the MICROFLUIDIZER® processor and has returned to ambient liquid pressures. A diagram of the preferred system set up and the inventive process is illustrated in FIG. 1.

The mixture stream and wax particle collisions are preferably allowed to continue until the average wax particle size is reduced (micronized) to about 0.1 µm to about 6 µm, more preferably from about 1 µm to about 6 µm, more preferably from about 1 µm to about 3 µm, and such that substantially all of the wax particles have a particle size of about 20 µm or less. More particularly, substantially all of the wax particles are reduced to have a particle size of from about 1 µm to about 20 µm, more preferably from about 1 µm to about 12 µm, still more preferably from about 1 µm to about 6 µm and most preferably from about 1 µm to about 3 µm. This process preferably disperses the wax particles in the water such that the dispersing agent is substantially completely coated onto the surfaces of substantially all of the wax particles. The resulting aqueous dispersions comprise from about 5% to about 45% by weight of the dispersion, more preferably from about 10% to about 45% by weight of the dispersion, still more preferably from about 20% to about 45% by weight of the dispersion, still more preferably from about 30% to about 45%, and most preferably from about 30% to about 40% by weight of the dispersions. The dispersing agent or agents are present in the aqueous wax dispersions in an amount of from greater than 0% to about 5% by weight relative to the weight of the wax, more preferably from: about 2% to about 5% and most preferably from about 4% to about 5%. The balance of the dispersion is preferably water, most preferably deionized water. The aqueous dispersions will have low viscosity at room temperature, particularly a viscosity of about 100 cps or less at about 25° C. at a wax concentration of about 10% by weight of the dispersion, more preferably about 50 cps or less and most preferably 20 cps or less at about 25° C. at a wax concentration of about 10% by weight of the dispersion. Low dispersion viscosities are also achieved at high wax concentrations. Particularly, a dispersion of the invention having a wax concentration of about 45% at about 25° C. has a preferred viscosity of about 200 cps or less, more preferably 100 cps or less and most preferably 50 cps or less, each of which are significant improvements over dispersions of the related art. Accordingly, for all dispersions including about 5% to about 45% wax solids, the viscosities are all stable Newtonian and have viscosities below 100 cps. Most preferably the particulate wax is substantially homogenously dispersed within the water, and homogenous dispersion is readily achieved when using one of the homogenizers described herein.

The aqueous wax dispersions may be combined with coating materials such as paints, primers, varnishes, such as overprint varnishes, and inks, such as flexographic inks, to form coating compositions that may be applied onto substrates to form coatings. The aqueous wax dispersions may also be combined with other dispersions, inside or outside the scope of this invention (including non-aqueous dispersions), without limitation, or with any other material as may be desired by a formulator. For example, one or more different wax dispersions within the scope of the invention may be produced and thereafter mixed together to produce a new material. Alternately, an aqueous dispersion of the invention may be combined with a dispersion of non-wax grade PTFE. In preferred embodiments, a coating composition preferably comprises from about 30% to about 45% of the aqueous wax dispersion, more preferably from about 30% to about 40%, and most preferably from about 35% to about 40% of the aqueous wax dispersion, based on the weight of the coating composition (i.e. the aqueous dispersion plus the coating material). Optimally, the aqueous dispersion will comprise 40% by weight of the coating composition, based on the weight of the coating composition. The coating composition may be applied onto any suitable substrate, including high quality paper substrates such as 80# centura gloss, flexible substrates such as paper, cardboard, fibers and fabrics, or rigid substrates such as reduced electrolytic tin or TFS (Tin Free Steel) plate for rigid food containers.

The following examples serve to illustrate, but not limit, the present invention:

EXAMPLES

Fourteen polyethylene homopolymer wax dispersions in water were produced and tested according to the following procedures:

Aqueous Wax Dispersion Samples

Examples 1-3

Each of the samples from Examples 1-3 incorporated A-C® 820A polyethylene homopolymer wax particles, commercially available from Honeywell International Inc., which has a weight average molecular weight ($M_w$) of 2,930, a number average molecular weight ($M_n$) of 1,300 and a polydispersity index of 2.25. These examples incorporated 1% by weight of Cytec OT-75% DSS surfactant, based on the weight of the dispersion, i.e. the combined weight of the wax plus the water and the surfactant.

Examples 4 and 5

Each of the samples from Examples 4 and 5 incorporated ACUMIST® B-18 polyethylene homopolymer wax particles, commercially available from Honeywell International Inc. having a weight average molecular weight (Me) of 2930, a number average molecular weight ($M_n$) of 1300 and a polydispersity of 2.25. These examples incorporated 2% by weight of OT-75 surfactant, based on the weight of the dispersion, i.e. the combined weight of the wax plus the water and the surfactant.

Examples 6 and 7

Each of the samples from Examples 6 and 7 incorporated ACUMIST® B-12 polyethylene homopolymer wax, commercially available from Honeywell International Inc., having the same $M_w$, $M_n$ and Pd of ACUMIST® B-18, differing from B-18 only in particle size of the dry wax. These examples incorporated 2.5% by weight of OT-75 surfactant, based on the weight of the dispersion, i.e. the combined weight of the wax plus the water and the surfactant.

Examples 8 and 9

Each of the samples from Examples 8 and 9 incorporated ACUMIST® B-12 polyethylene homopolymer wax. These examples incorporated 2.0% by weight of Triton X-100 surfactant (polyoxyethylene octyl phenyl ether), based on the weight of the dispersion, i.e. the combined weight of the wax plus the water and the surfactant.

Examples 10-12

Each of the samples from Examples 10-12 incorporated ACUMIST® B-12 polyethylene homopolymer wax. These examples incorporated 2.0% by weight of Cytec OT-NV surfactant, based on the weight of the dispersion, i.e. the combined weight of the wax plus the water and the surfactant.

Examples 13 and 14

Each of the samples from Examples 13 and 14 incorporated ACUMIST® B-12 polyethylene homopolymer wax. These examples incorporated 2.0% by weight of Cytec OT-100 surfactant, based on the weight of the dispersion, i.e. the combined weight of the wax plus the water and the surfactant.

Example 15

The sample from Example 15 incorporated ACUMIST® 1204 polymethylene homopolymer wax (Fischer Tropsch wax) commercially available from Honeywell International Inc., having a weight average molecular weight of 990, a number average molecular weight of 850 and a polydispersity index of 1.2. This example incorporated 2.0% by weight of Cytec OT-100 surfactant, based on the weight of the dispersion, i.e. the combined weight of the wax plus the water and the surfactant.

For each of Examples 1-15, Tables 3A and 3B list the initial mean value (Mv) and top particle sizes, the amount (%) of water in each dispersion sample, the amount (%) of active wax in each sample, the processing pressure in the homogenizer, the recirculation time or number of single passes through the homogenizer channels. In the context of the homogenizer apparatus used, which is described in detail below, "one pass" means the wax dispersion has been passed once through the microfluidizer processor, being subjected once to the applied pressure and passed once through the two microchannel chambers in the processor, and having been exited and collected in a vessel at atmospheric pressure before re-entering the loop for a second pass. The mean value particle size and the top particle size of the wax particles after processing through the homogenizer at the specified pressure for the specified duration, and the resulting viscosity of each sample after processing. The smaller initial wax particle sizes, which range from 12 µm Mv to 250 µm Mv, were achieved by mechanically reducing the 250 µm diameter particles in an air jet micronizer using a fluidized bed opposed jet mill model AFG 630 commercially available from Hosokawa Micron Group of Japan.

Apparatus:

Aqueous wax dispersions were prepared in utilizing a model M-110EH-30 MICROFLUIDIZER® processor, commercially available from Microfluidics Corp. that was equipped with a recirculation loop as well as micro-channels having micro-channel diameter sizes of 200 µm (chamber model no. H30Z) and 75 µm (chamber model no. F20Y), which are connected and positioned in tandem for further processing. An onboard heat exchanger built in by the manufacturer, Microfluidics Corp., is positioned after the second micro-channel chamber and is designed to cool the steam after the wax-water stream has exited the second chamber. A second heat exchanger was positioned between the first and second micro-channel chambers and was designed to cool the wax-water stream after exiting the first micro-channel chamber but before entering the second micro channel chamber. The processor was connected to a low temperature, liquid cooled chiller (Model LTW-05-CCB-SP, commercially available from Budzar Industries of Willoughby, Ohio), which operates at a temperature range of from about −10° F. (−23.33° C.) to about 30° F. (−1.1° C.), to remove heat produced by the MICROFLUIDIZER® processor. The chiller was connected to a house utilities chiller to remove any heat generated by the chiller itself.

Process Steps:

Mixtures were prepared by charging water, surfactant and dry wax particles, in that order, into a one liter jacketed, stainless steel pre-dispersion vessel with an internal propeller blade mixer. The components were blended with the propeller blade with moderate agitation. The resultant mixture was subsequently allowed to cool in a refrigerator to 5° C., and was thereafter introduced into the MICROFLUIDIZER® processor. The mixture was then passed though the microfluidizer recirculation loop such that it was 1) recirculated for a period of time (e.g. about 30 minutes per one liter quantity); or 2) passed through the loop a single time, recollected in a suitable container, and passed through the loop again, until the desired particle size reduction and viscosity values were achieved. Single passes that are repeated are preferred to insure that all the material has been exposed to the same processing conditions where as recirculation may cause part of the material to be treated differently than another. The viscosity is not related to the number of passes, but is determined by the temperature of the process. It must be below 50° C. when exiting the chambers, and viscosity and particle size reduction is determined by how efficient the temperature of the process is managed. The cooler the better, but freezing the lines is not wanted, so entering the chamber at a temperature of about around 2° C. is preferred, and the temperature is preferably controlled to be around 2° C. so the mixture does not exit the loop at higher than 50° C. The mixture will increase from 2° C. to 50° C. in about one second when 30,000 psi is applied and when the flow of the mixture stream is restricted through 75 micron diameter channels. If the temperature is above 50° C., the viscosities are high and even gels, creams and/or pastes are produced. These products are more useful for personal care applications rather than ink and paint coatings. A diagram of this set up and the process is illustrated in FIG. 1.

During processing, the heat generated by the microfluid processor was removed by both the manufacturers' integrated heat exchanger as well as the low temperature, liquid cooled chiller, as well as with an inter-chamber cooling heat exchanger positioned between the inter-chambers of the processor. Both of the heat exchangers were tube and tank types and were constructed to withstand up to 60,000 psi. The circulation type and duration for each of Examples 1-15 are specified in Tables 3A and 3B. After processing, the dispersion was transferred to a one liter jacketed, stainless steel dispersion tank with an internal propeller blade mixer, and then to a storage tank with tank also equipped with a mixer.

Particle size measurements were determined by use of a MICROTRAC® 3500 model particle size analyzer in a water medium. Viscosities were measured according to conventional techniques using a Brookfield rotational viscometer.

TABLE 3A

| Example | Wax Type | Initial Particle Size Mv (µm) | Initial Particle Top Size (µm) | Wax % | Final Particle Size Mv (µm) | Final Particle Top Size (µm) |
|---|---|---|---|---|---|---|
| 1 | A-C® 820A | 250 | 1000 | 20% | — | — |
| 2 | A-C® 820A | 250 | 1000 | 20% | 4.21 | 26.16 |
| 3 | A-C® 820A | 250 | 1000 | 20% | 3.02 | 22.00 |
| 4 | ACUMIST® B-18 | 18 | 62 | 40% | 9.87 | 25.22 |
| 5 | ACUMIST® B-18 | 18 | 62 | 40% | 4.06 | 18.5 |
| 6 | ACUMIST® B-12 | 13 | 44 | 45% | 10.65 | — |
| 7 | ACUMIST® B-12 | 13 | 44 | 45% | 7.03 | 37.00 |
| 8 | ACUMIST® B-12 | 13 | 44 | 40% | 9.02 | 37.00 |
| 9 | ACUMIST® B-12 | 13 | 44 | 40% | 4.2 | 22.00 |
| 10 | ACUMIST® B-12 | 13 | 44 | 40% | 5.26 | 31.11 |
| 11 | ACUMIST® B-12 | 13 | 44 | 40% | 3.61 | 22.00 |
| 12 | ACUMIST® B-12 | 13 | 44 | 40% | 2.81 | 11.00 |
| 13 | ACUMIST® B-12 | 13 | 44 | 40% | 6.06 | 18.5 |
| 14 | ACUMIST® B-12 | 13 | 44 | 40% | 4.81 | 18.5 |
| 15 | ACUMIST® 1204 | 7.7 | 37 | 30% | 4.98 | 31.11 |

TABLE 3B

| Example | Surfactant | Water % | Process Pressure (psi) | Recirculation Time/Number of Passes | Dispersion Viscosity (cps) |
| --- | --- | --- | --- | --- | --- |
| 1 | 1% OT-75 | 79% | 10000 (68.95 MPa) | 10 min | Non-Gelled, Milky Liquid |
| 2 | 1% OT-75 | 79% | 20000 (137.9 MPa) | 20 min | Non-Gelled, Milky Liquid |
| 3 | 1% OT-75 | 79% | 24000 (165.5 MPa) | 30 min | Non-Gelled, Milky Liquid |
| 4 | 2% OT-75 | 58% | 15000 (103.4 MPa) | 1 pass | Non-Gelled, Milky Liquid |
| 5 | 2% OT-75 | 58% | 25000 (172.4 MPa) | 5 passes | 100 cps (100 mPa-sec) |
| 6 | 2.5% OT-75 | 52.5% | 25000 (172.4 MPa) | 2 passes | Non-Gelled, Milky Liquid |
| 7 | 2.5% OT-75 | 52.5% | 23000 (158.6 MPa) | 7 passes | 155 cps (155 mPa-sec) |
| 8 | 2% Triton X-100 | 58% | 30000 (206.8 MPa) | 7 passes | Non-Gelled, Milky Liquid |
| 9 | 2% Triton X-100 | 58% | 30000 (206.8 MPa) | 17 passes | 39.5 cps (39.5 mPa-sec) |
| 10 | 2% OTNV | 58% | 30000 (206.8 MPa) | 7 passes | Non-Gelled, Milky Liquid |
| 11 | 2% OTNV | 58% | 30000 (206.8 MPa) | 17 passes | Non-Gelled, Milky Liquid |
| 12 | 2% OTNV | 58% | 30000 (206.8 MPa) | 24 passes | 17.5 cps (17.5 mPa-sec) |
| 13 | 2% OT-100 | 58% | 30000 (206.8 MPa) | 2 passes | 820 cps (820 mPa-sec) |
| 14 | 2% OT-100 | 58% | 30000 (206.8 MPa) | 5 passes | 375 cps (357 mPa-sec) |
| 15 | 2% OT-100 | 68% | 30000 (206.8 MPa) | 2 passes | 37 cps (37 mPa-sec) |

Figure 3C:
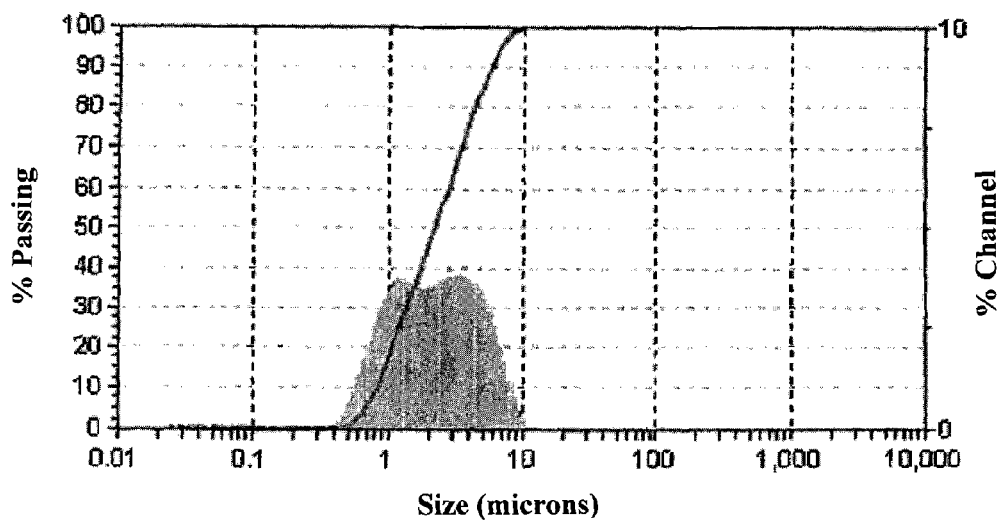

Conclusions:

By combining a wax having a smaller initial particle size with water and a dispersing agent, it was found that a higher initial concentration of polymer could be realized, up to about 45%. This also allowed for a further reduction in particle size in the mixture in the homogenizer with fewer processing passes or time spent in the microfluidizer, reducing the required processing time and energy requirements. The best results are exhibited in sample number 12. After 24 passes the lowest particle size of 2.81 Mv and a maximum top size below 11 μm was achieved with a low viscosity of 17.5 cps at 40% wax solids wax concentration. A summary of the particle size analysis conducted on the dispersion from Example 12 is presented in FIGS. 3A-3C.

Example 16 and Comparative Examples 17 and 18

A water-based flexographic ink sample was produced according to the following process:

An ink sample was made comprising 35% by weight of a phthalo blue pigment dispersion and 65% by weight of a letdown vehicle, based on their combined weight. The composition of the phthalo blue pigment dispersion is detailed in Table 4, and comprised an aqueous wax dispersion of the invention combined with a phthalo blue pigment, with a pigment/binder ratio of 4.676175 (grams dry pigment to grams dry binder polymer (HPD 296 solids)). The composition of the letdown vehicle is detailed in Table 5, and was wax-free but high gloss.

TABLE 4

PHTHALO BLUE DISPERSION FORMULATION

| Ingredient | Amount by Weight (g) | Amount by Percentage |
| --- | --- | --- |
| JONCRYL ® HPD 296 styrene acrylate resin solution | 195.52 | 29.19% |
| 70 mole Ethoxylated Alcohol Surfactant | 6.16 | 0.92% |
| Phthalocyanine Blue Pigment BW 1531 | 320.00 | 47.77% |
| Silicone-based defoamer BYK-022 | 7.00 | 1.05% |
| WATER | 141.17 | 21.07% |

JONCRYL ® HPD 296 is a styrene acrylate resin solution commercially available from BASF Corp. of Parsippany, NJ.
BW 1531 is a phthalocyanine blue pigment commercially available from Pacific Coast Enterprises of Houston, Texas.
BYK-022 is a silicone-based defoamer commercially available from Byk Chemie GmbH of Wesel, Germany.

TABLE 5

PHTHALO BLUE DISPERSION FORMULATION

| Ingredient | Amount by Weight (g) | Amount by Percentage |
| --- | --- | --- |
| MORCRYL ® 410 | 120.00 | 40% |
| LUCIDENE ® 604 | 69.00 | 23% |
| LUCIDENE ® 615 | 90.00 | 30% |

TABLE 5-continued

PHTHALO BLUE DISPERSION FORMULATION

| Ingredient | Amount by Weight (g) | Amount by Percentage |
|---|---|---|
| AEQUENOL ™ 1700-70 Non-Ionic Surfactant | 6.00 | 2% |
| DYNOL ™ 604 | 3.00 | 1% |
| Water | 12.00 | 4% |

MORCRYL ® 410 is an acrylic copolymer resin (34% solids), commercially available from Rohm and Haas Chemicals, L.L.C. of Philadelphia, PA.
LUCIDENE ® 604 is an acrylic copolymer emulsion commercially available from Rohm and Haas Chemicals, L.L.C.
LUCIDENE ® 615 is an acrylic copolymer emulsion commercially available from Rohm and Haas Chemicals, L.L.C.
AEQUENOL ™ 1700-70 is an alkenyl phenol ethoxylate non-ionic surfactant commercially available from Palmer International, Inc. of Skippack, PA.
DYNOL ™ 604 is a surface tension reducing agent commercially available from Air Products and Chemicals, Inc. of Allentown, PA.

Wax dispersions from polyethylene homopolymer waxes were produced according to the techniques described in Examples 115 above. For Example 16, the wax dispersion was the same as used in Example 12, and the wax particle size mean value was 2.81 μm. For Comparative Examples 17 and 18, two phthalo blue ink with polyethylene homopolymer wax dispersions were prepared for comparative testing using commercial wax dispersions 1) LIQUITRON® 250 commercially available from The Lubrizol Corporation of Wickliffe, Ohio, and described by the manufacturer as a polyethylene homopolymer-water dispersion having an average particle size of 6 to 8 microns at 25% solids concentration and 2) MICROSPERSION® MPP 611XF, a commercially available finely micronized polyethylene wax dispersion from Micro Powders, Inc. of Tarrytown, N.Y. These wax dispersions are conventionally used for flexographic ink applications. The polyethylene homopolymer wax in each dispersion had a wax particle size mean value of 6 μm. For each of Examples 16-18, the wax dispersions were added to the ink formulations at 1% wax solids to ink solids by weight to the ink formulation, and the amount of wax dispersions added were adjusted based on the relative difference in % solids of each product, so a total weight of 1% dry wax was added.

Each ink sample (with wax added) was proofed onto an 80# Centura Gloss substrate using a 550 laser engraved ceramic anilox printing roller. The carrying capacity of the ceramic anilox is 2.7 billion cubic microns per square inch (BCM). In addition, a second thicker ink amount was applied onto the same substrate using a 360 P 113 chrome anilox printing roller having a carrying capacity of 3.7 BCM. Thus, each ink sample was applied and tested at 2.7 BCM and 3.7 BCM film thicknesses.

Rub tests were done using a Sutherland Rub tester with a 4# block according to the procedures of ASTM F-1571-95. Tests were conducted for a total of 80 rubs for each ink. Optical density measurements were made of the ink rubbed off the proof to determine the degree of rub off of a given sample. Static Coefficient of Friction tests were conducted using a static slide angle device according to the procedures of ASTM D-4918-97 and the resulting angle at which sliding commenced was noted. Gloss measurements were made using a Byk Tri Gloss meter and a 60° angle of incidence according to the procedures of ASTM D2457. Ink viscosity measurements were taken on a Brookfield LVF Digital DVII Pro Viscometer with a SC4-31 spindle at 45.16 revolutions per minute (RPMs), according to the methods of ASTM D-2196. The results of the respective tests are outlined in Table 6, where a) the higher the 60% Gloss number, the more glossy the ink; b) the lower the slide angle, the better the slip; c) the lower the 80 rub number, the better the rub off, or less ink is rubbed off, d) the lower the ink viscosity, the better the application from the anilox printing rolls; and e) the lower the wax dispersion viscosity, the less the impact on ink application viscosity.

TABLE 6

Phthalo Blue Flexographic Ink Performance Testing With Wax Added

| EXAMPLE | Wax-Dispersion Added | 60% Gloss At 2.7 BCM | 60% Gloss At 3.7 BCM | Slide Angle At 2.7 BCM | Slide Angle At 3.7 BCM | 80 Rubs At 2.7 BCM | Ink Viscosity With Wax | Wax Dispersion Viscosity |
|---|---|---|---|---|---|---|---|---|
| 16 | See Example 12 | 42.48 | 43.72 | 16.0 | 17.0 | 0.073 | 314.81 cps | 27.5 cps |
| 17 (Comp.) | LIQUITRON ® 250 | 41.14 | 38.34 | 16.3 | 17.0 | 0.076 | 491.48 cps | 504.1 cps |
| 18 (Comp.) | MPP 611XF | 40.8 | 39.86 | 17.3 | 17.0 | 0.076 | 323.45 cps | 101.6 cps |

TABLE 7

| | SAMPLE: | | |
|---|---|---|---|
| RPM | LIQUITRON ® 250 Viscosity (cps) | MPP 611XF Viscosity (cps) | EX. 12 Sample Viscosity (cps) |
| 63.87 | 435.79 | 121.63 | 23.95 |
| 57.63 | 455.39 | 105.65 | 14.57 |
| 51.39 | 477.42 | 100.39 | 15.17 |
| 45.16 | 504.10 | 101.62 | 17.27 |
| 38.92 | 541.77 | 108.66 | 19.27 |
| 32.68 | 593.81 | 110.14 | 17.44 |
| 26.45 | 673.58 | 107.73 | 18.14 |
| 20.21 | 793.99 | 111.31 | 13.36 |
| 13.97 | 989.77 | 115.94 | 17.18 |
| 7.74 | 1457.05 | 116.25 | 15.50 |
| 1.5 | 4399.06 | 499.89 | 15.0 |

Figure 2:
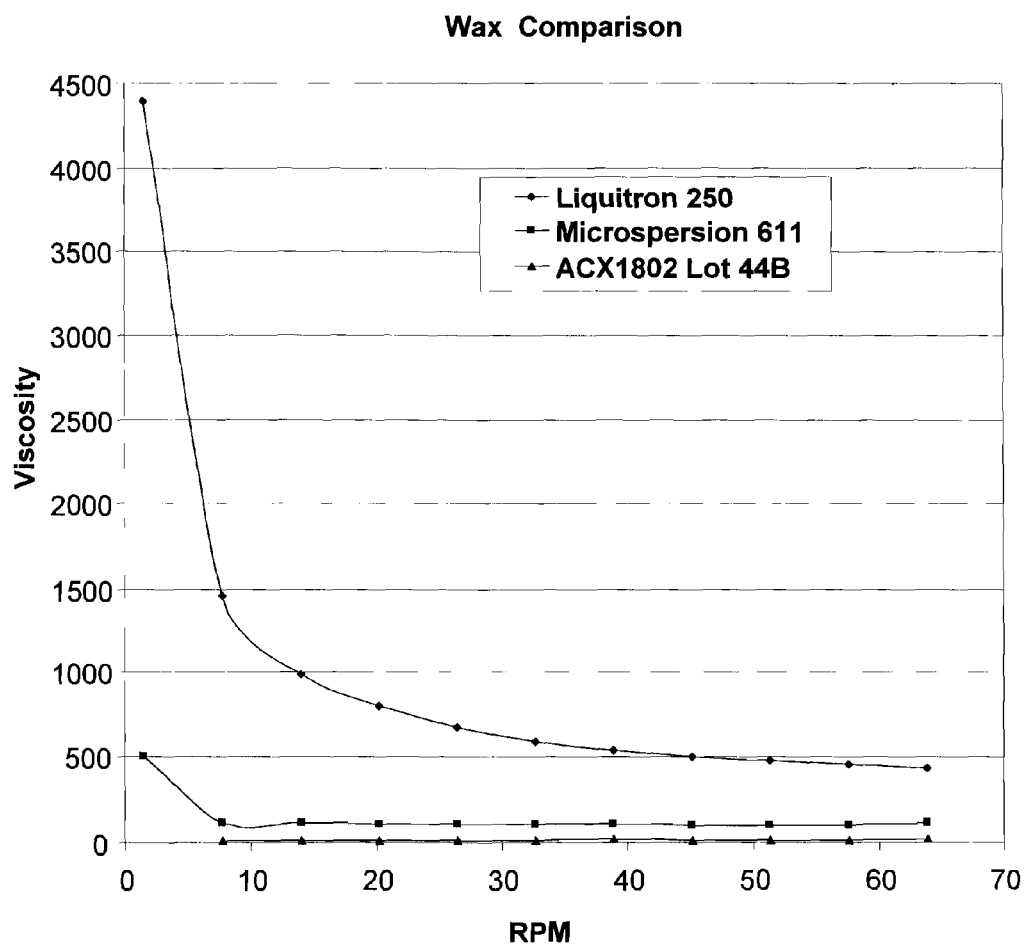
FIG. 2 is a graph of viscosity values measured in Examples 16-18.

Table 7 summarizes viscosity measurements taken with a Brookfield LVF Digital DVII Pro Viscometer with a $SC_{4-31}$ spindle at various RPMs. The results of the viscosity measurements from Table 7 are illustrated graphically in FIG. 2.

Conclusions:

These results illustrate that the sample from Example 12 (incorporating 40% by weight ACUMIST® B-12 polyethylene homopolymer wax, 2.0% by weight OTNV surfactant, and 58% by weight deionized water; particle size Mv=2.81) improved the performance of the flexographic ink performance relative to commercial controls LIQUITRON® 250 and MPP 611XF. The superior performance is attributed to lower particle size of the inventive wax dispersion, which has been previously unavailable, its compatibility with water-based inks, its low dispersion viscosity and its low impact on ink application viscosity.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A method of producing an aqueous wax dispersion comprising:
    a) combining at least one particulate wax comprising a plurality of wax particles having an average particle size of greater than about 6 µm, with water and with at least one dispersing agent to form a mixture; and
    b) subjecting the mixture to conditions sufficient to disperse the wax particles in the water and to coat the surfaces of at least some of the wax particles with the dispersing agent; and to reduce the size of the wax particles such that the average wax particle size is from about 0.1 µm to about 6 µm and such that substantially all of the wax particles have a particle size of about 20 µm or less; and thereby producing an aqueous wax dispersion wherein the particulate wax comprises from about 5% to about 45% by weight of the dispersion; wherein the dispersing agent comprises from greater than 0% to about 5% by weight based on the weight of the particulate wax; and wherein the dispersion has a viscosity of about 100 cps or less at about 25° C. at a wax concentration of about 10% by weight of the dispersion, and a viscosity of about 200 cps or less at about 25° C. at a wax concentration of about 45% by weight of the dispersion,
    wherein the mixture is continuously maintained at a temperature or temperatures that are below about 50° C.

2. The method of claim 1 wherein step b) is conducted by:
    i) separating the mixture into a plurality of mixture streams;
    ii) causing the mixture streams to continuously collide with each other, and thereby causing the wax particles to continuously collide with each other, at a pressure and velocity sufficient to generate heat and to result in wax particle size reduction; and
    iii) continuously removing the heat generated by the particle collisions and cooling the mixture.

3. The method of claim 1 wherein the mixture is continuously maintained at a temperature or temperatures of from about 2° C. to below about 50° C. during step b).

4. The method of claim 1 wherein the particulate wax comprises particles having an initial average particle size of greater than about 20 µm and a reduced average particle size of from about 1 µm to about 6 µm.

5. A method of preparing a coating composition comprising combining the aqueous wax dispersion produced according to claim 1 with at least one coating material to thereby form a coating composition.

6. A method of preparing a coating which comprises applying the coating composition formed according to claim 5 onto a substrate.

7. A method of producing a dispersion comprising:
    a) combining at least one particulate material comprising a plurality of particles with a solvent and with at least one dispersing agent to form a mixture; and
    b) subjecting the mixture to conditions sufficient to disperse the particles in the solvent and to coat the surfaces of at least some of the particles with the dispersing agent; and to at least partially reduce the size of the particles and to thereby produce an dispersion wherein the particulate material comprises from about 5% to about 45% by weight of the dispersion; wherein the dispersing agent comprises from greater than 0% to about 5% by weight based on the weight of the particulate material; and wherein the dispersion has a viscosity of about 100 cps or less at about 25° C. at a particulate material concentration of about 10% by weight of the dispersion, and a viscosity of about 200 cps or less at about 25° C. at a particulate material concentration of about 45% by weight of the dispersion,
    wherein the mixture is continuously maintained at a temperature or temperatures that are below about 50° C.

8. The method of claim 7 wherein the mixture is continuously maintained at a temperature or temperatures of from about 2° C. to below about 50° C. during step b).

9. The method of claim 7 wherein the particulate material is a wax or a resin.

10. The method of claim 7 wherein the solvent comprises water.

11. The method of claim 7 wherein step b) is conducted by:
    i) separating the mixture into a plurality of mixture streams;
    ii) causing the mixture streams to continuously collide with each other, and thereby causing the particles to continuously collide with each other, at a pressure and velocity sufficient to generate heat and to result in particle size reduction; and
    iii) continuously removing the heat generated by the particle collisions and cooling the mixture.

* * * * *